Figure 4:
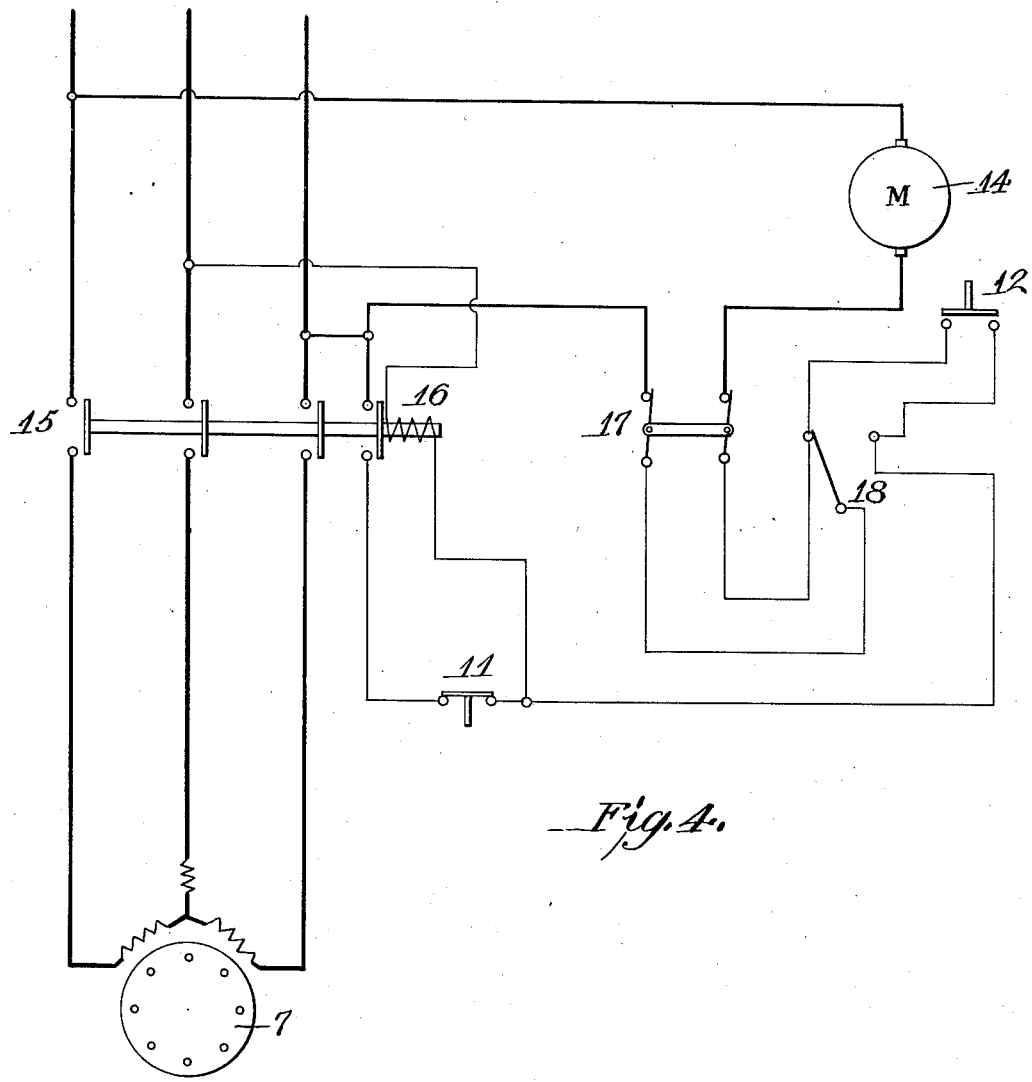

July 21, 1931.    H. FEIGE    1,815,555
TRAVELING TRAY OVEN
Filed March 31, 1930    2 Sheets-Sheet 1
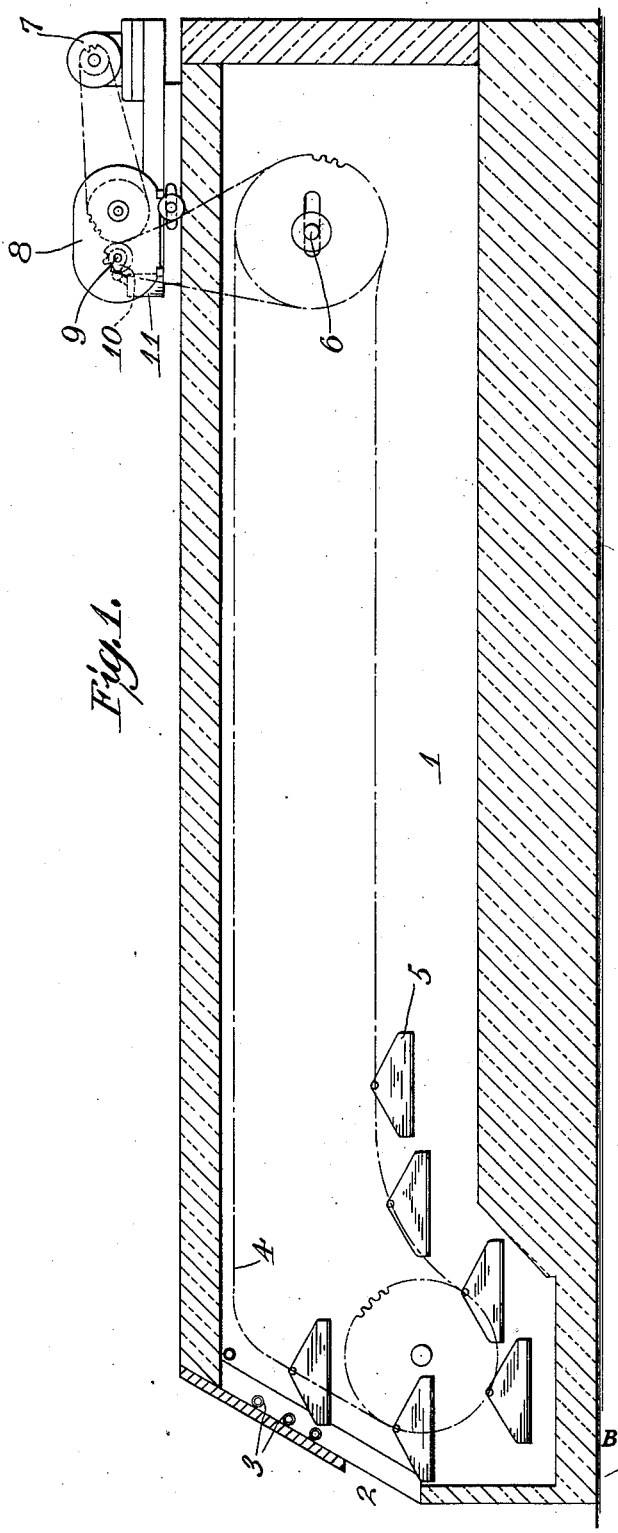
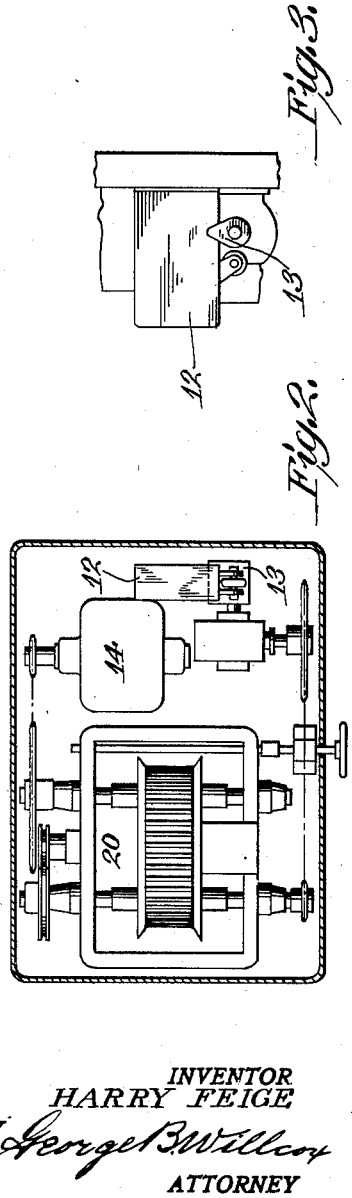
INVENTOR
HARRY FEIGE
BY George B. Willcox
ATTORNEY July 21, 1931.  H. FEIGE  1,815,555
TRAVELING TRAY OVEN
Filed March 31, 1930   2 Sheets-Sheet 2

INVENTOR
HARRY FEIGE
BY
*George B. Willcox*
ATTORNEY

Patented July 21, 1931

1,815,555

UNITED STATES PATENT OFFICE

HARRY FEIGE, OF SAGINAW, MICHIGAN, ASSIGNOR TO BAKER PERKINS COMPANY, INC., OF SAGINAW, MICHIGAN, A CORPORATION OF NEW YORK

TRAVELING TRAY OVEN

Application filed March 31, 1930. Serial No. 440,298.

This invention relates to improvements in bake ovens equipped with intermittently moving traveling conveyors which alternately stop and start during the baking process. The conveyors may be either tray type or plate type, although the invention is primarily applicable to the traveling tray oven.

Certain difficulties inherent in the construction of previous intermittently traveling ovens have been overcome by my invention. These difficulties arose from the fact that the intermittency of these earlier ovens was timed entirely from the conveyor drive mechanism. The intermittent motion was imparted mechanically to the conveyor, consequently the ratio of one period or rest to one period of motion was always constant.

For purposes of illustration, let us assume an oven of the type mentioned above, having a mechanical motion incorporated in the conveyor drive to give the conveyor alternately a forward motion through one tray pitch distance, and then a period of rest. If this conveyor has twenty-eight trays and a baking time of fourteen minutes is wanted, as for rolls or other light small products, the conveyor must move forward one tray pitch every thirty seconds. This thirty seconds will be divided, for example, into fifteen seconds of rest and fifteen seconds of motion. Thus a tray will rest at the loading door for fifteen seconds, the goods to be baked will be placed thereon, then the tray will be carried ahead one pitch distance in fifteen seconds and will be quickly in range of the steam injectors. With any baked goods on which steam is used, it is necessary to apply the steam as soon as possible, before the dough surface becomes heated and starts to dry. This is accomplished satisfactorily in the oven described when a short baking time is desired.

If this oven is to be used for baking large heavy loaves, such as rye bread, the baking time is extended to about an hour, or as a definite illustration, let us assume fifty-six minutes. When the average speed of the conveyor is adjusted to give this time, a tray will advance one pitch distance in two minutes. Since the time that the conveyor is at rest is equal to the time that it is in motion a tray will stop at the loading opening one minute, then move ahead one pitch distance in one minute. During this minute required for the tray to travel within range of the steam injectors, a loaf is exposed to the hot atmosphere of the oven, with the result that its skin or crust will be partially dried, and subsequent expansion of the loaf may crack the crust or cause it to separate from the body of the loaf. Also the heating of this skin before it is steamed reduces the condensation of moisture thereon, which is the principal object of steaming.

From the foregoing it is apparent that attempts to adjust the baking time by changing the linear speed of travel of an intermittently driven conveyor have not been entirely satisfactory.

It is to overcome this and certain other inherent difficulties in the old type of intermittently traveling oven that the present apparatus has been developed.

My invention overcomes the above described difficulties by providing a uniformly rapid rate of conveyor travel regardless of the length of baking time, so that goods loaded onto a tray are always quickly introduced into proximity to the steam injectors. Adjustment of the baking time is effected by changing only the length of the periods during which the conveyor is stationary.

The primary object of the present invention is to provide in combination with an intermittent traveling oven a novel combination of means whereby the baking time can be changed by the operator at will, to suit large loaves requiring a long baking time or small loaves or buns that require only a short baking time, without necessarily changing the speed of the conveyor during its forwarding movement.

The invention, therefore, provides a conveyor stopping mechanism associated with and operated by the conveyor or some part of its driving mechanism, and a starting device arranged and adapted to start the conveyor at variable predetermined regular intervals of time, independently of the movement of the conveyor and of its driving mechanism. The dwell of the tray at the loading and unloading door is thus increased or decreased at will and the effective baking period can be changed to any extent desired without disturbing the normal speed of the conveyor during its forwarding movement.

In the foregoing statement is set forth the broader aspects of the novel feature of the invention. In its more specific aspect it includes certain preferred mechanisms and means for manipulating them, whereby the operator is enabled to make the above mentioned time adjustments under the conditions of commercial baking.

The means by which I preferably attain this object, in the embodiment of the invention chosen for purposes of illustration, consists in a continuously operating timing or clocking means, preferably a constant speed motor, driving a cam or other means for actuating a relay switch for starting the conveyor motor through a variable speed gearing adjustable by the operator.

Referring to the drawings, Fig. 1 is a diagrammatic section in side elevation of a single lap traveling tray oven to which my invention is applied. 1 indicates the oven, 2 the loading and unloading aperture, 3, steam injector pipes located in the initial part of the oven passage. 4 indicates the conveyor, carrying swinging trays 5. This conveyor is driven by a motor 7 through a reduction gear 8 of conventional type connected to a sprocket on the conveyor shaft 6.

The conveyor stopping mechanism will now be described. A cam 10 is fixed to the power output shaft 9 of the reduction gear. This cam trips a switch 11 of the conventional push button type incorporated in a relay circuit which operates to open the power circuit to the conveyor drive motor 7, stopping the conveyor once in each tray pitch distance of travel, in other words, each time a tray 5 is in register with the loading aperture 2.

I have shown cam 10 fixed to power shaft 9 of the reduction gear, as this shaft can conveniently be given a normal rate of rotation relative to that of the conveyor shaft 6, such that a single lobe cam, as 10, can be used. However, a suitable cam may be fixed to any other shaft in the conveyor drive-mechanism, or may be mounted on one of the conveyor sprocket shafts, as 6, in co-operative relation with the relay switch which interrupts the travel of the conveyor. It would also lie within the scope of my invention to dispense with the cam entirely, and locate the relay switch so as to be tripped by contact with the trays 5 or with properly spaced lugs carried by each tray or by the conveyor chain 4. Therefore, I do not intend to limit myself to the specific location of the conveyor-stopping cam 10 and switch 11 which I show in the drawings. By the term "actuated by the conveyor" as applied to the conveyor-stopping mechanism I mean: actuated by the conveyor proper or by any part of its driving mechanism which operates at a speed bearing a constant relation to the linear speed of the conveyor.

Figs. 2 and 3 show the conveyor starting and timing mechanism whereby the conveyor is started at predetermined regular intervals. It comprises a switch 12 similar to switch 11, but arranged in the relay circuit to close the power circuit to drive motor 7. This switch is tripped at regular intervals by a cam 13 driven at constant speed through suitable gearing from a small constant speed motor 14. In order to provide for varying the length of time between actuations of the starting switch 12, the gearing connecting motor 14 to cam 13 includes speed changing means of known type. In the preferred embodiment of my invention I use a variable speed transmission 20 of the Reeves type.

Fig. 4 is a wiring diagram showing the connections of the relay circuit, indicated by light lines, the main power circuit, indicated by heavy lines, the relay or limit switches, and the constant speed motor of the timing mechanism. 15 is a magnetic switch of conventional type which is normally open and is adapted to be closed by a solenoid 16. This switch controls the power circuit to the drive motor and also one leg of the relay circuit which supplies the solenoid 16 to hold the switch 15 closed.

17 is a secondary switch controlling the auxiliary power circuit of the constant speed timing motor 14 and the current for the relay circuit. In its open position it interrupts the power supplied to the timing motor and the main switch solenoid. Thus it serves as a master control switch for the conveyor driving motor, the constant speed timing motor and the control circuits. Switch 18 is a two-way switch whereby the constant speed motor 14 is cut into or out of operation, making the oven conveyor 4 travel intermittently or continuously as desired.

When the normally open starting limit switch 12 is momentarily closed the solenoid 16 of the power switch 15 is energized, closing the switch 15 and starting the conveyor drive motor 7. Opening the normally closed limit switch 11 breaks the solenoid holding circuit and causes the main switch to open, stopping the conveyor drive motor.

By this stated combination of devices the motor that drives the oven conveyor is stopped by the action of the conveyor itself upon the arrival of each tray at the charging door, and after the lapse of any predetermined interval of time the operator has chosen and for which he has set the variable speed gearing, the conveyor is automatically started again.

When the nature of the goods is changed to require a shorter or longer baking time the operator by turning a handle adjusts the variable speed mechanism through which the power of the small timing motor is transmitted to the timing switch. By this means he causes the timing switch to operate more or less frequently and correspondingly increases or decreases the frequency of operation of the conveyor. It will be noted, however, that in every case the actual linear speed of the conveyor remains the same. The function of the adjustable timer is to increase or decrease the dwell of the individual trays at the charging door without changing the speed at which they travel from the charging door into the steam zone.

This invention is not confined to the specific embodiment shown and described in the drawings and specification. As to the electrical equipment, other forms of switches and circuits such as are well known in electric practice may be substituted for those described above. For instance, a single relay switch may be arranged to be alternately opened by the conveyor stopping cam and closed by the cam of the conveyor starting mechanism. Nor do I intend to limit myself to electrical means operating to stop and start the conveyor drive motor. It might be desirable, for example, to drive the oven conveyor from a constantly running source of power and interrupt its travel by a clutch, magnetic or mechanical, released periodically by the action of the driving mechanism, and engaged at timed intervals by any suitable timing mechanism independent of the conveyor of its driving mechanism.

Having thus described my invention, what I claim and desire to secure by Letters Patent is:

1. In an oven, a traveling conveyor, driving means for the conveyor including an electric motor, a main power circuit for the motor, a relay circuit for controlling the power circuit, a limit switch in the relay circuit for stopping the driving motor, said switch arranged in co-operative relation to said conveyor driving means, a second limit switch in the relay circuit for starting the driving motor, and adjustable timing mechanism, independent of the conveyor driving means, arranged to actuate said second limit switch for starting the driving motor at predetermined regular intervals.

2. In combination with a bake oven having a conveyor and power-driven actuating mechanism therefor, a tripping device operatively associated with said conveyor actuating mechanism, a limit switch adapted to be tripped thereby each time said conveyor traverses a predetermied unit distance and arranged in a relay circuit to interrupt the power for driving the coveyor, a conveyor-starting mechanism adapted to be actuated independently of the movement of the conveyor and its drive mechanism, a limit switch adapted to be tripped by said conveyor-starting mechanism and arranged in said relay circuit to restor the power for driving the conveyor, continuously operated timing mechanism operatively associated with said conveyor-starting mechanism and adjustable to vary at will the frequency of action of the conveyor-starting mechanism.

3. In combination with a baking oven having a conveyor and power-driven actuating mechanism therefor, a conveyor-stopping mechanism actuated by the conveyor each time said conveyor traverses a predetermined unit distance, a conveyor-starting device adapted to be put into action independently of the movement of the conveyor and of its drive mechanism, a relay circuit arranged to control the conveyor driving power, switches in said relay circuit arranged to be actuated by said conveyor-starting and conveyor-stopping mechanisms whereby the relay circuit is opened by one of said mechanisms and closed by the other.

4. In combination with a baking oven having a conveyor and power-driven actuating mechanism therefor, a conveyor-stopping mechanism operable each time said conveyor traverses a predetermined unit distance, a conveyor-starting device adapted to be put into action independently of the movement of the conveyor and of its drive mechanism, continuously operating timing means operatively associated with said conveyor-starting device and adjustable to vary at will the frequency of action of the conveyor starting device.

In testimony whereof, I affix my signature.

HARRY FEIGE.